United States Patent
Kudrna et al.

(10) Patent No.: US 10,889,367 B2
(45) Date of Patent: Jan. 12, 2021

(54) FEEDBACK SYSTEM FOR PITCH-ADJUSTABLE BLADES OF AIRCRAFT BLADED ROTOR

(71) Applicant: PRATT & WHITNEY CANADA CORP., Longueuil (CA)

(72) Inventors: Richard Kudrna, Carignan (CA); Ian Farrell, Greenfield Park (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 193 days.

(21) Appl. No.: 15/495,070

(22) Filed: Apr. 24, 2017

(65) Prior Publication Data

US 2018/0304991 A1    Oct. 25, 2018

(51) Int. Cl.
*B64C 11/30* (2006.01)
*B64D 27/10* (2006.01)
(Continued)

(52) U.S. Cl.
CPC ............ *B64C 11/301* (2013.01); *B64D 27/10* (2013.01); *G01D 5/147* (2013.01); *G01D 5/20* (2013.01);
(Continued)

(58) Field of Classification Search
CPC ...... B64C 11/301; B64D 27/10; G01D 5/147; G01D 5/20; G01P 3/488; F02C 6/206; F05D 2220/323
(Continued)

(56) References Cited

U.S. PATENT DOCUMENTS 2,919,322 A * 12/1959 Dietrich ................. H01H 51/28
                                                                 335/88
3,131,382 A *  4/1964 Valenta .................... G11C 11/12
                                                                 365/55
(Continued)

FOREIGN PATENT DOCUMENTS

EP          0353076 A2    1/1990
EP          2400307 A1    12/2011
(Continued)

OTHER PUBLICATIONS

Euopean Patent Office, Communication dated Jun. 14, 2018 enclosing European search report re: application No. 18169088.4.
(Continued)

*Primary Examiner* — Connor J Tremarche
(74) *Attorney, Agent, or Firm* — Norton Rose Fulbright Canada LLP

(57) ABSTRACT

Systems and methods for providing pitch position feedback for pitch-adjustable blades of an aircraft bladed rotor are disclosed. In one embodiment, the systems include a sensor comprising a magnet having a magnetic field, a pole piece coupled to a first pole of the magnet and directing the magnetic field toward the feature and a coil mounted in the magnetic field. The coil generates a sensor signal indicative of a variation in the magnetic field caused by movement of the feature in the magnetic field. The sensor also includes a magnetic shield mounted in the magnetic field. The magnetic shield defines a magnetic return path for some magnetic flux of the magnetic field exiting the pole piece toward an opposite second pole of the magnet.

11 Claims, 12 Drawing Sheets

(51) Int. Cl.
  *G01D 5/20* (2006.01)
  *G01D 5/14* (2006.01)
  *G01P 3/488* (2006.01)
  *F02C 6/20* (2006.01)

(52) U.S. Cl.
  CPC .............. *G01P 3/488* (2013.01); *F02C 6/206* (2013.01); *F05D 2220/323* (2013.01)

(58) Field of Classification Search
  USPC ......................................................... 416/27
  See application file for complete search history.

(56) References Cited

U.S. PATENT DOCUMENTS

| | | | |
|---|---|---|---|
| 3,626,226 A * | 12/1971 | Pauwels | G01P 3/443 |
| | | | 188/181 A |
| 3,710,623 A | 1/1973 | Boyd et al. | |
| 40,405,738 | 8/1977 | Buzzell | |
| 4,647,892 A * | 3/1987 | Hewitt | G01P 1/026 |
| | | | 310/155 |
| 4,700,133 A | 10/1987 | Day | |
| 4,934,901 A | 6/1990 | Duchesneau | |
| 5,897,293 A | 4/1999 | Arel et al. | |
| 5,913,659 A | 6/1999 | Doolin et al. | |
| 6,077,040 A | 6/2000 | Pruden et al. | |
| 6,326,781 B1 | 12/2001 | Kunde et al. | |
| 8,687,206 B2 | 4/2014 | Hockaday | |
| 2004/0227638 A1 * | 11/2004 | Frank | B60R 22/48 |
| | | | 340/687 |
| 2010/0166201 A1 * | 7/2010 | Shim | H04R 9/02 |
| | | | 381/71.1 |
| 2011/0308331 A1 * | 12/2011 | Bodin | G01L 3/109 |
| | | | 73/862.193 |
| 2014/0007591 A1 | 1/2014 | Khibnik et al. | |
| 2015/0139798 A1 | 5/2015 | Duke et al. | |
| 2015/0292962 A1 * | 10/2015 | Lu | G01L 1/125 |
| | | | 73/862.69 |
| 2018/0050789 A1 | 2/2018 | Marone et al. | |
| 2018/0050816 A1 | 2/2018 | Yakobov et al. | |

FOREIGN PATENT DOCUMENTS

| | | | |
|---|---|---|---|
| EP | 2876046 A1 * | 5/2015 | .............. G01P 3/488 |
| EP | 2876046 A1 | 5/2015 | |
| FR | 2344022 A1 | 10/1977 | |

OTHER PUBLICATIONS

European Patent Office, Communication dated Mar. 9, 2020 re: Application No. 18169088.4.

English translation of France patent document No. FR 2344022 dated Oct. 7, 1977, https://www65.orbit.com/?locale=en&ticket=e1210b52-140e-41b1-9bb9-3aff4086e4fb&embedded=false#PatentDocumentPage, accessed on May 15, 2020.

* cited by examiner

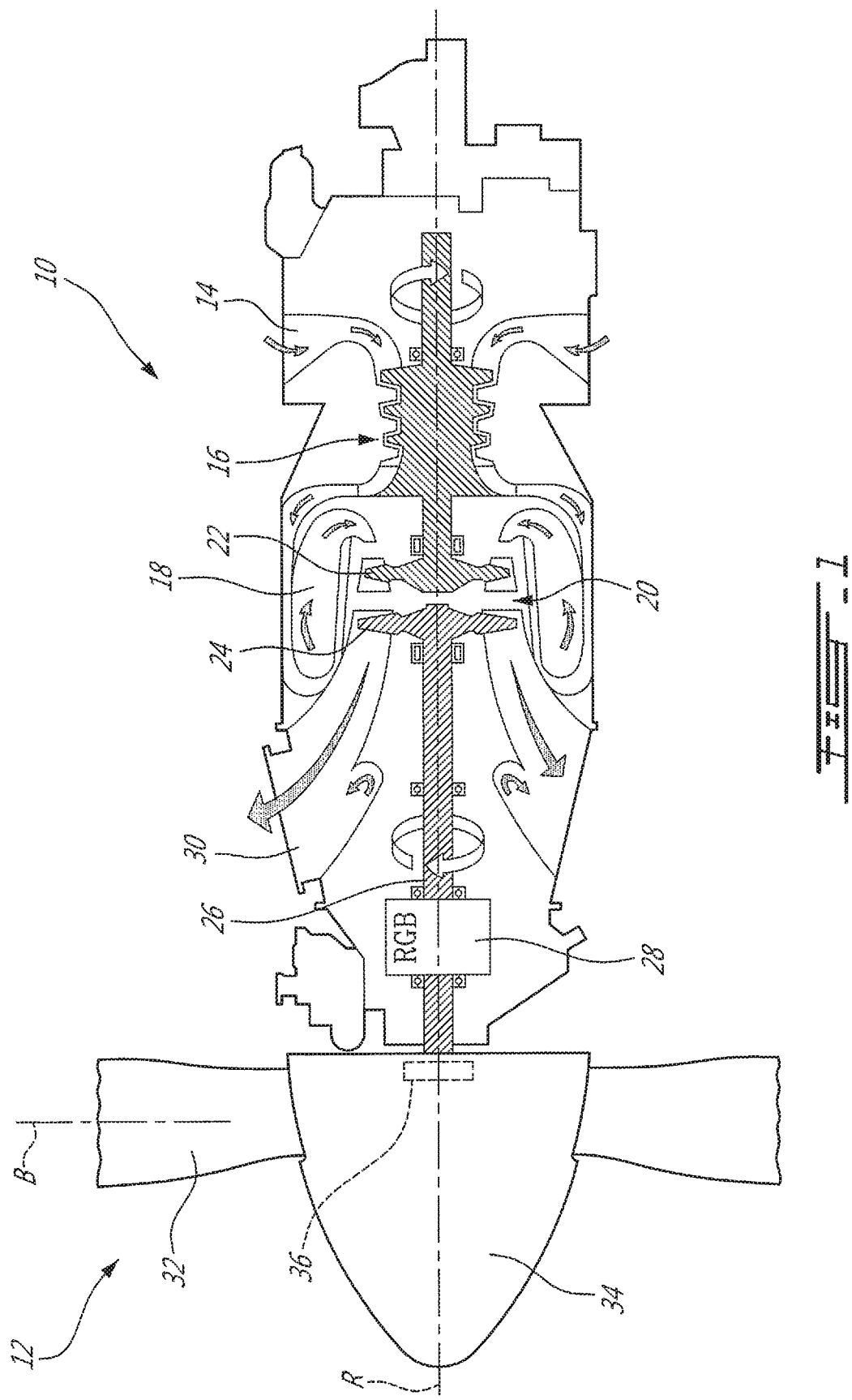

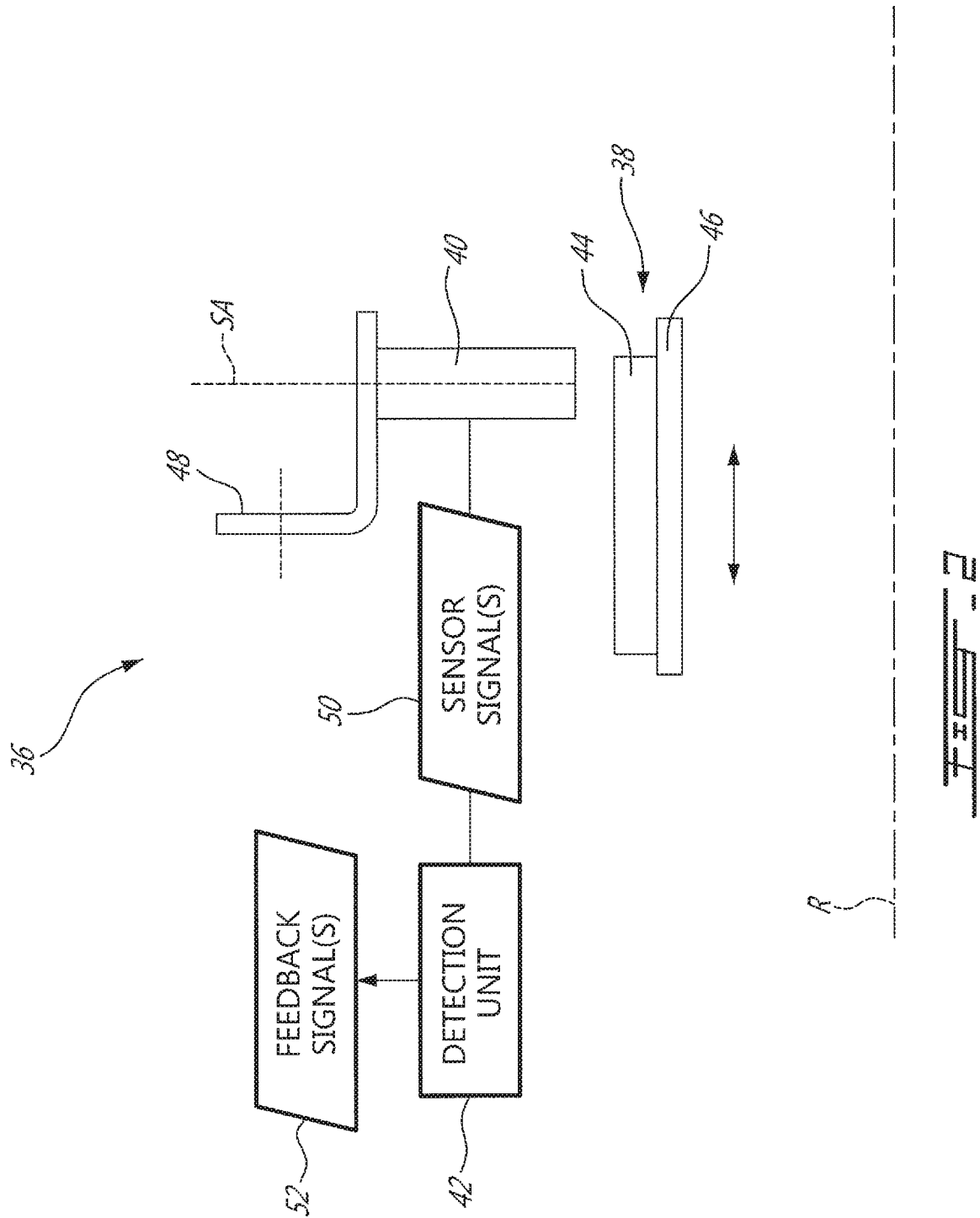

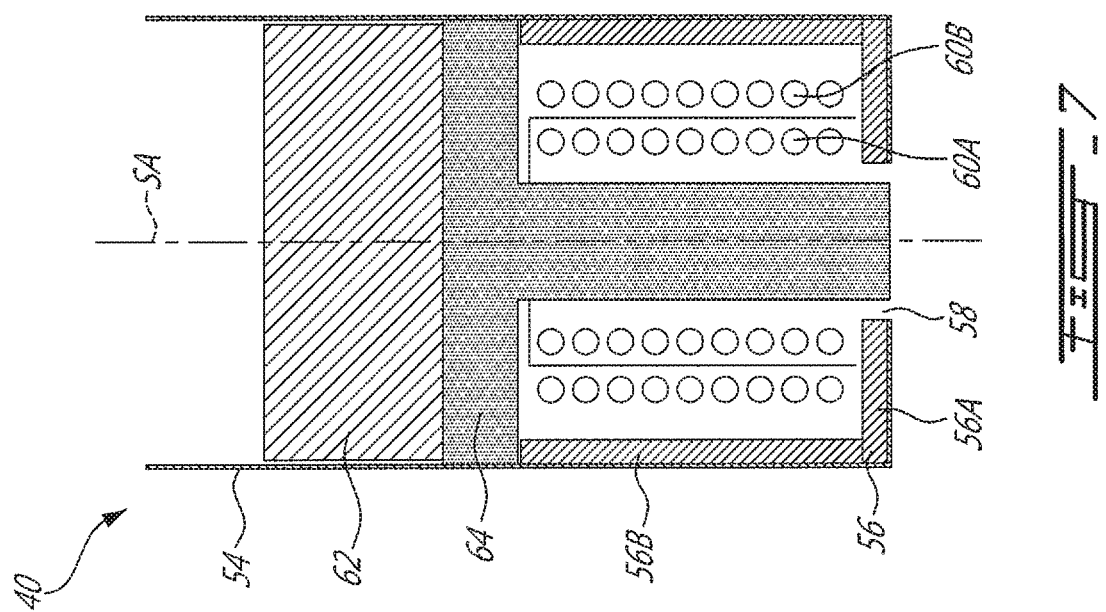

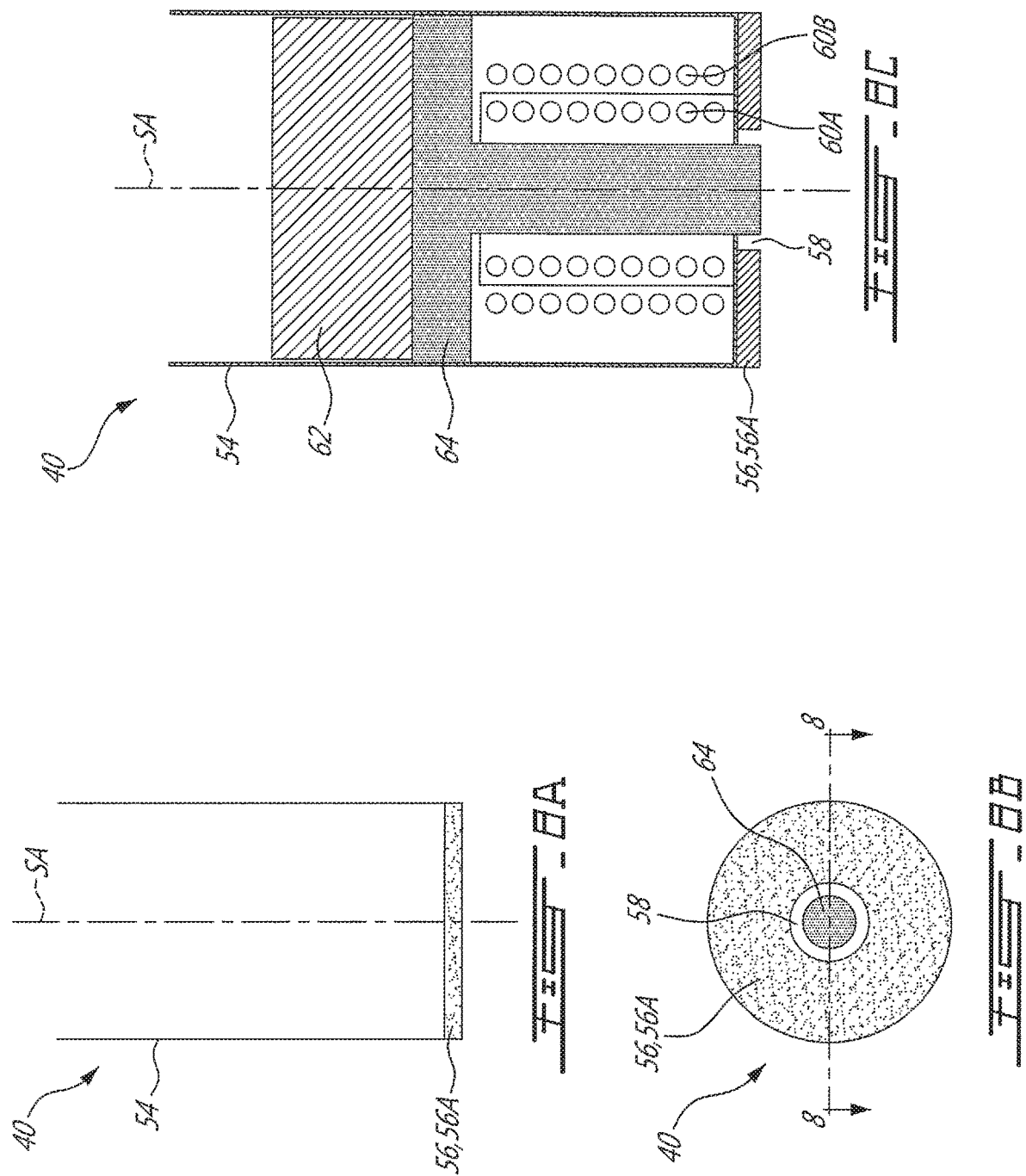

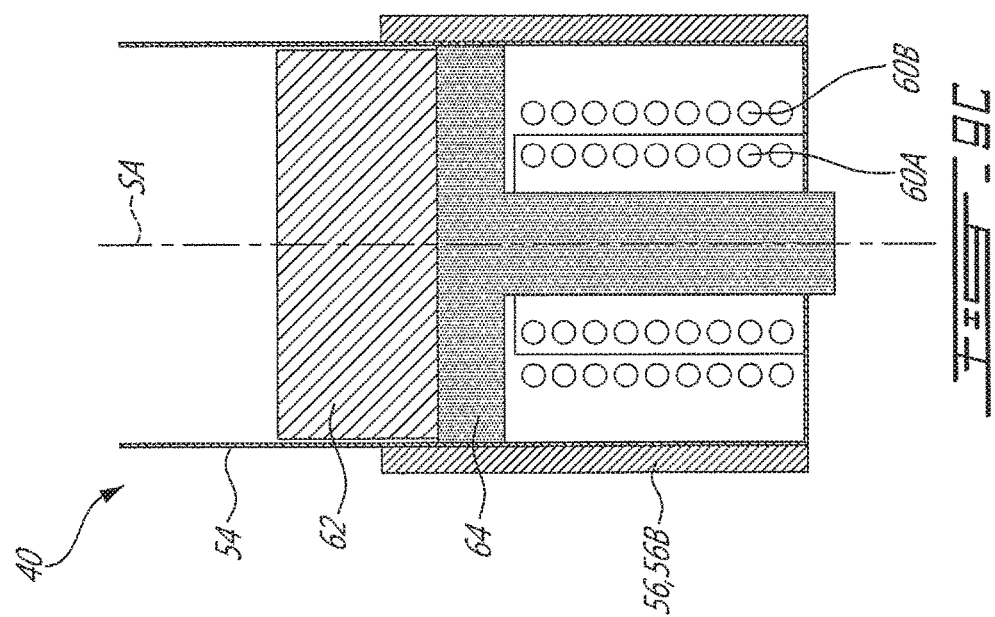
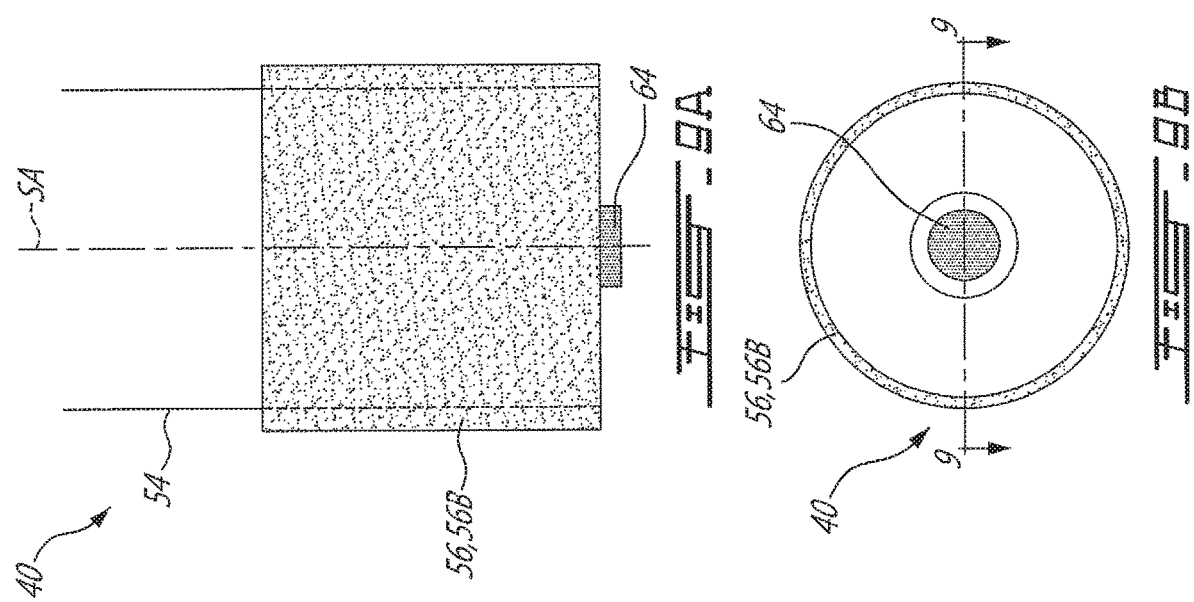

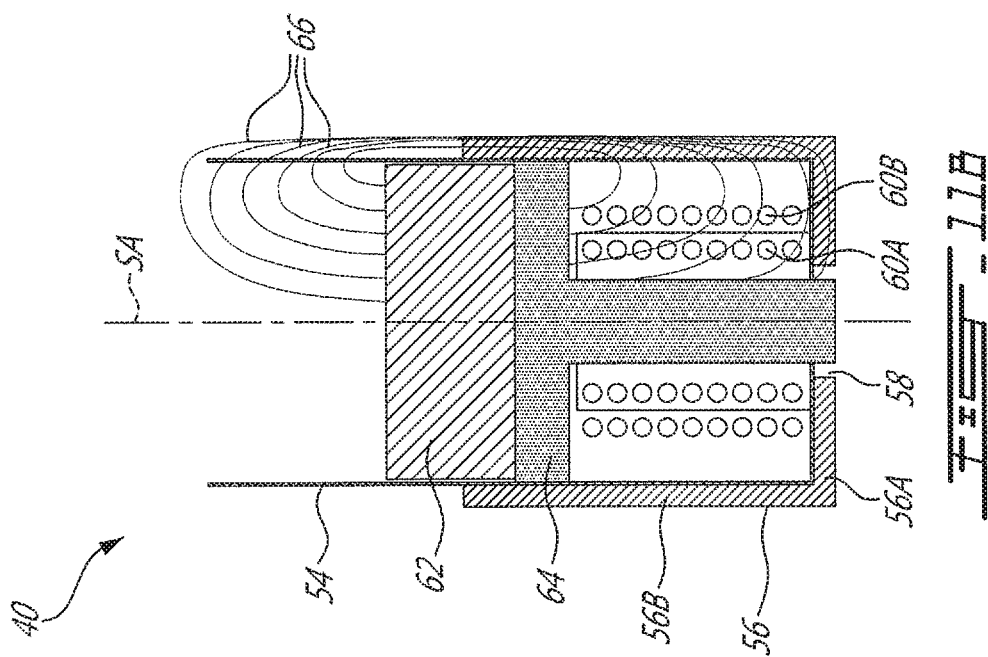
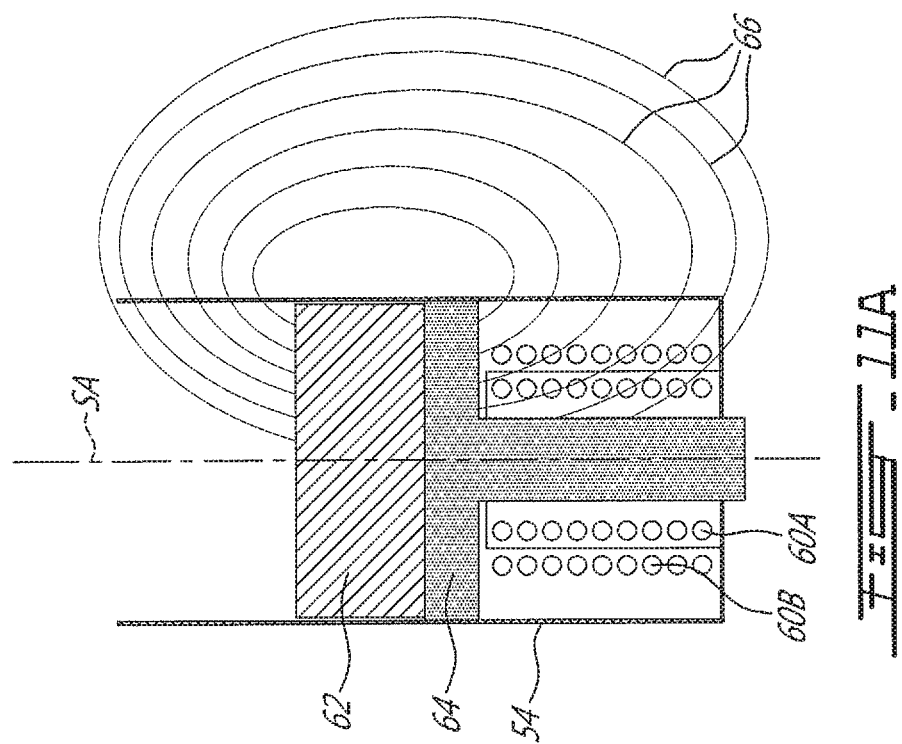

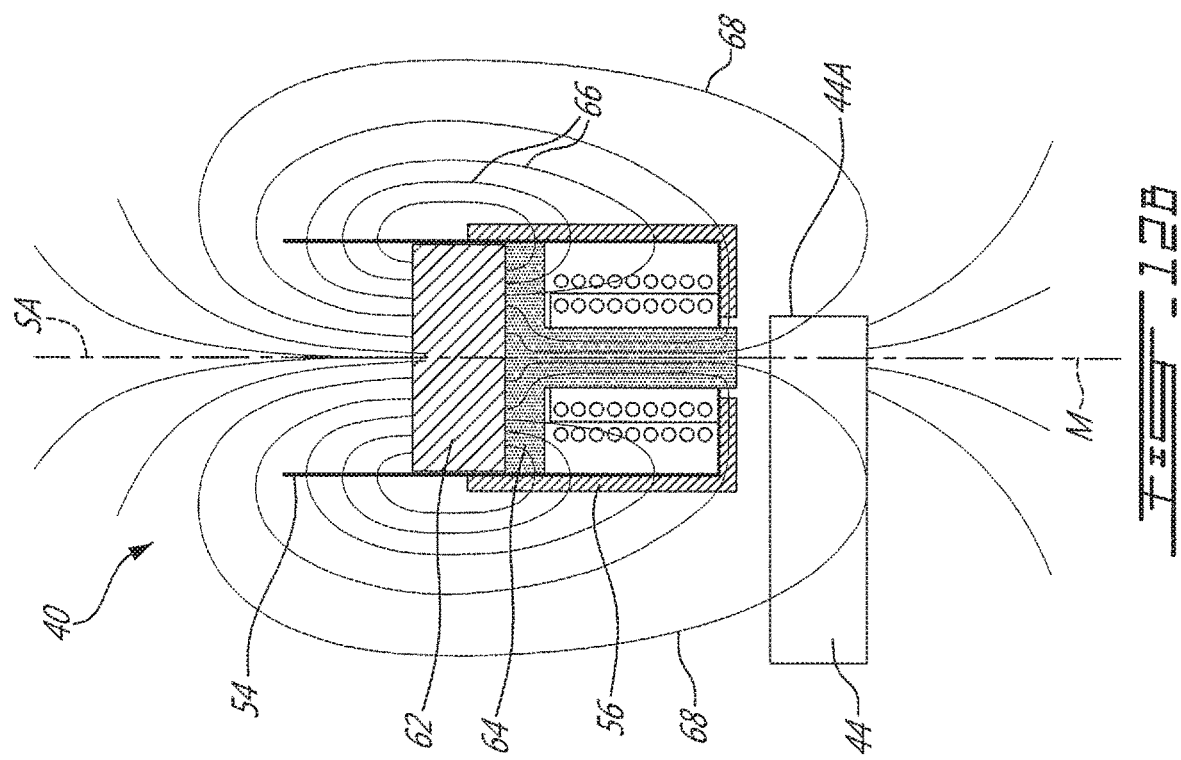
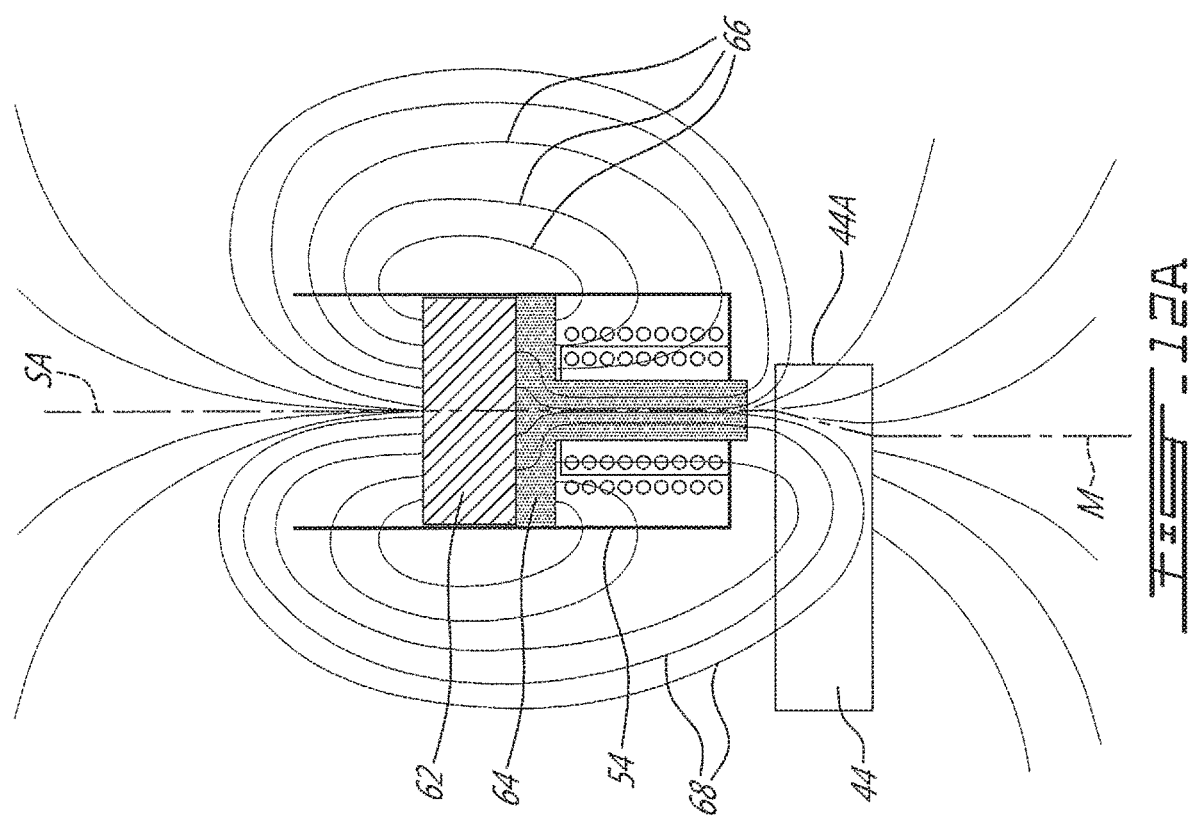

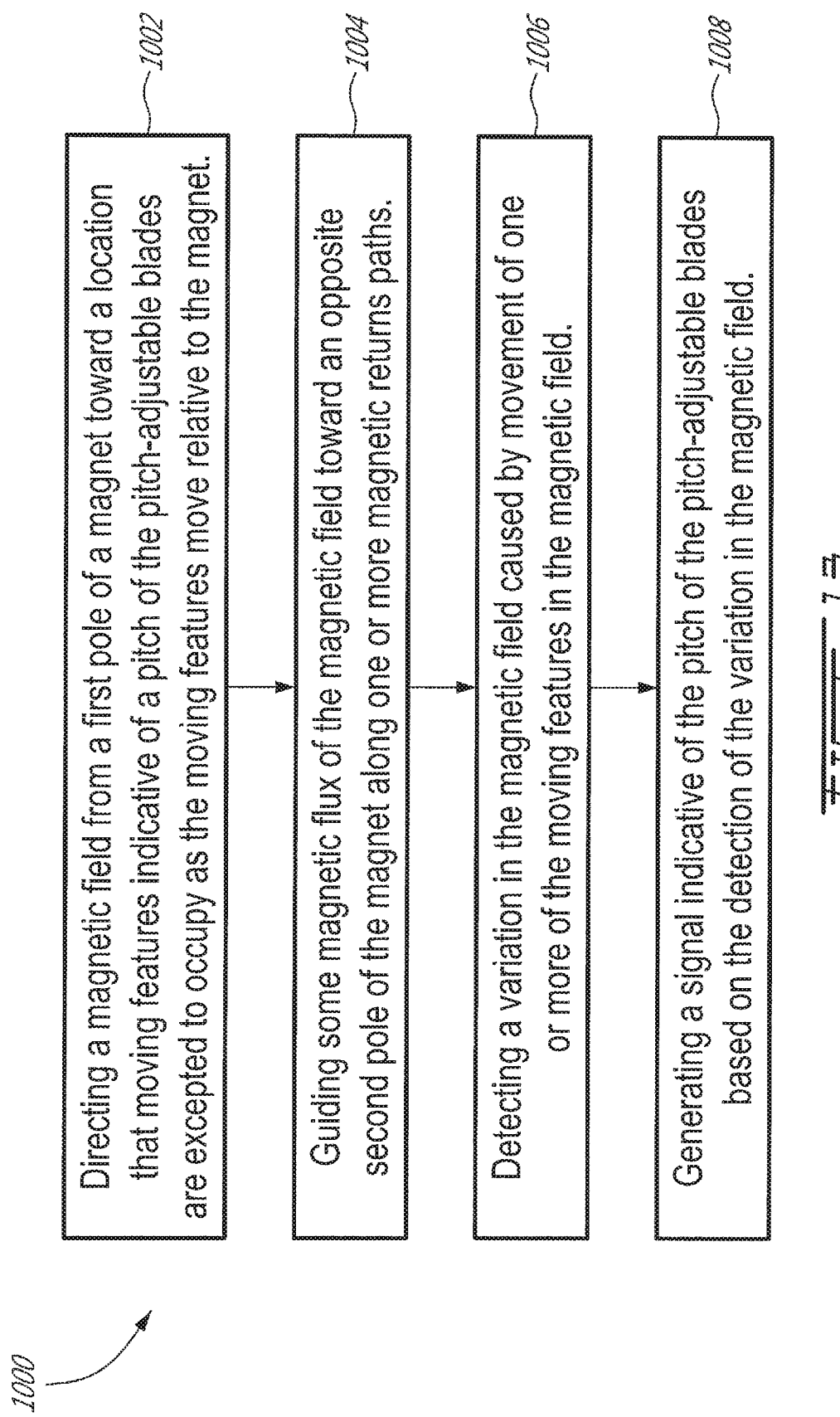

FEEDBACK SYSTEM FOR PITCH-ADJUSTABLE BLADES OF AIRCRAFT BLADED ROTOR

TECHNICAL FIELD

The disclosure relates generally to aircraft engines, and more particularly to feedback systems for pitch-adjustable blades of bladed rotors of aircraft.

BACKGROUND

On aircraft propeller systems that have variable pitch propeller blades, it is desirable to provide accurate feedback on the angular position, sometimes referred to as "beta angle", of the propeller blades. Such feedback can be used to control such angular position as desired in a feedback control loop based on a requested set point. Such angular position feedback can also be used to ensure that the propeller is not inadvertently commanded to transition into excessively low or reverse beta angles, which could potentially be hazardous in some phases of flight of the aircraft.

SUMMARY

In one aspect, the disclosure describes an engine having a feedback system for pitch-adjustable blades of an aircraft bladed rotor where the system comprises:

a feedback rotor configured to rotate with the aircraft bladed rotor about a rotation axis, the feedback rotor being axially displaceable along the rotation axis to a plurality of axial positions, the axial position of the feedback rotor corresponding to a respective pitch position of the pitch-adjustable blades, the feedback rotor comprising features spaced circumferentially around the feedback rotor;

a stationary magnet mounted in the engine adjacent the rotating feedback rotor, the magnet having a magnetic field;

a pole piece coupled to a first pole of the magnet and configured to direct the magnetic field toward the features;

a coil mounted in the magnetic field and being stationary relative to the magnet, the coil configured to generate a sensor signal indicative of a variation in the magnetic field caused by movement of one or more of the features in the magnetic field as the feedback rotor rotates relative to the magnet;

a magnetic shield mounted in the magnetic field and being stationary relative to the magnet, the magnetic shield defining a magnetic return path for some magnetic flux of the magnetic field exiting the pole piece toward an opposite second pole of the magnet; and a detection unit operatively connected to the coil and configured to generate a feedback signal indicative of the respective pitch position of the pitch-adjustable blades in response to the sensor signal received from the coil.

The pole piece may be disposed between the magnet and the feedback rotor.

The magnetic shield may comprise an aperture for permitting passage of the magnetic field through the magnetic shield via the aperture.

The pole piece may extend into the aperture in the magnetic shield.

In some embodiments, at least part of the magnetic shield may be disposed inside a sensor housing containing the magnet, the coil and the pole piece.

In some embodiments, at least part of the magnetic shield may be disposed outside a sensor housing containing the magnet, the coil and the pole piece.

The pole piece may be disposed between the magnet and the feedback rotor.

The magnetic shield may comprise a bottom wall and one or more side walls cooperatively defining a receptacle within which part of the coil and part of the pole piece are received. The bottom wall may include an aperture for permitting passage of the magnetic field through the bottom wall.

The coil may be a first coil and the sensor signal may be a first sensor signal indicative of the variation in the magnetic field on a first channel. The system may comprise a second coil configured to generate a second sensor signal indicative of the variation in the magnetic field on a second channel.

Embodiments may include combinations of the above features.

In another aspect, the disclosure describes a sensor for detecting a moving feature. The sensor comprises:

a magnet having a magnetic field;

a pole piece coupled to a first pole of the magnet and directing the magnetic field toward the feature;

a coil mounted in the magnetic field, the coil configured to generate a sensor signal indicative of a variation in the magnetic field caused by movement of the feature in the magnetic field; and a magnetic shield mounted in the magnetic field, the magnetic shield defining a magnetic return path for some magnetic flux of the magnetic field exiting the pole piece toward an opposite second pole of the magnet.

The sensor may comprise a housing containing the magnet, the pole piece and the coil. In some embodiments at least part of the magnetic shield may be disposed inside the housing.

The sensor may comprise a housing containing the magnet, the pole piece and the coil. In some embodiments at least part of the magnetic shield may be disposed outside the housing.

The magnetic shield may comprise a wall with an aperture for permitting passage of the magnetic field through the magnetic shield via the aperture.

The pole piece may extend into the aperture in the wall of the magnetic shield.

The coil may be a first coil and the sensor signal may be a first sensor signal indicative of the variation in the magnetic field on a first channel. The sensor may comprise a second coil configured to generate a second sensor signal indicative of the variation in the magnetic field on a second channel redundant to the first channel.

The magnetic shield may comprise a bottom wall and one or more side walls cooperatively defining a receptacle within which part of the coil and part of the pole piece are received. The bottom wall may include an aperture for permitting passage of the magnetic field through the bottom wall.

The pole piece may extend into the aperture in the wall of the magnetic shield.

Embodiments may include combinations of the above features.

In a further aspect, the disclosure describes a method for providing pitch position feedback for pitch-adjustable blades of an aircraft bladed rotor. The method comprises:

directing a magnetic field from a first pole of a magnet toward a location that moving features indicative of a pitch of the pitch-adjustable blades are expected to occupy as the moving features move relative to the magnet, the magnetic field including first magnetic flux intersecting the location that the moving features are expected to occupy and second magnetic flux not intersecting the location that the moving features are expected to occupy;

guiding the second magnetic flux toward an opposite second pole of the magnet along one or more magnetic return paths;

detecting a variation in the magnetic field caused by movement of one or more of the moving features in the magnetic field; and generating a signal indicative of the pitch of the pitch-adjustable blades based on the detection of the variation in the magnetic field.

The method may comprise directing the first magnetic flux through an aperture in a wall of a magnetic shield defining the one or more magnetic return paths.

The method may comprise detecting the variation in the magnetic field in a redundant manner.

Embodiments may include combinations of the above features.

Further details of these and other aspects of the subject matter of this application will be apparent from the detailed description included below and the drawings.

DESCRIPTION OF THE DRAWINGS

Reference is now made to the accompanying drawings, in which:

FIG. 1 is an axial cross-section view of an aircraft engine coupled to a bladed rotor with pitch-adjustable blades;

FIG. 2 is a schematic representation of a partial axial cross-section of an exemplary pitch feedback system for the pitch-adjustable blades of the bladed rotor;

FIG. 7 is a cross-sectional view of another exemplary sensor of the feedback system of FIG. 2;

FIGS. 8A and 8B are respective schematic front and bottom views of another exemplary sensor of the feedback system of FIG. 2;

FIG. 8C is a cross-sectional view of the sensor of FIGS. 8A and 8B taken along line 8-8 in FIG. 8B;

FIGS. 9A and 9B are respective schematic front and bottom views of another exemplary sensor of the feedback system of FIG. 2;

FIG. 9C is a cross-sectional view of the sensor of FIGS. 9A and 9B taken along line 9-9 in FIG. 9B;

FIGS. 11A and 11B are cross-sectional views of a sensor without and with a magnetic shield respectively to show the effect of the magnetic shield on leakage magnetic flux;

FIGS. 12A and 12B are cross-sectional views of the sensor of FIGS. 11A and 11B respectively to show the effect of the magnetic shield on a magnetic field near an edge of a detectable feature; and FIG. 13 is a flowchart of a method for providing pitch position feedback for pitch-adjustable blades of an aircraft bladed rotor.

DETAILED DESCRIPTION

Figure 3A:
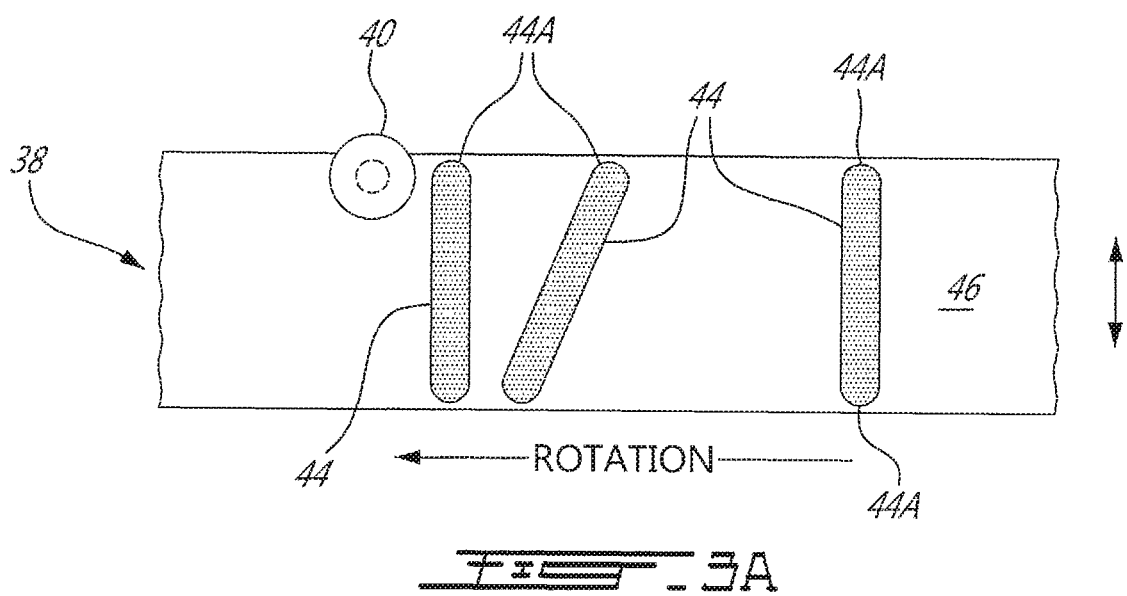
FIGS. 3A and 3B are schematic respective top and side views of a sensor and a feedback rotor for the feedback system of FIG. 2.

The following description discloses systems, sensors and methods useful in providing feedback on the angular (i.e., pitch) position of pitch-adjustable blades on aircraft bladed rotors such as aircraft propellers for example. In some embodiments, the systems, sensors and methods disclosed herein make use of the detection of variations in a magnetic field caused by the movement (e.g., passage) of one or more moving detectable features to generate one or more signals indicative of the angular position of the pitch-adjustable blades. In some embodiments, the systems, sensors and methods disclosed herein may use a magnetically permeable shield that guides some magnetic flux in the magnetic field along one or more magnetic return paths in order to promote a configuration of the magnetic field that is favorable to accurate detection of the one or more detectable features. In some embodiments, the systems, sensors and methods disclosed herein may permit the detection of such detectable feature(s) using a location near one or more respective edges of the one or more detectable feature(s) by mitigating edge effects on the magnetic field.

Aspects of various embodiments are described through reference to the drawings.

FIG. 1 is an axial cross-section view of an exemplary aircraft engine 10 coupled to bladed rotor 12 (e.g., propeller) for an aircraft (not shown). Engine 10 may be a gas turbine engine, of a type typically provided for use in subsonic flight, comprising inlet 14, into which ambient air is received, (e.g., multi-stage) compressor 16 for pressurizing the air, combustor 18 in which the compressed air is mixed with fuel and ignited for generating an annular stream of hot combustion gases, and turbine section 20 for extracting energy from the combustion gases. Turbine section 20 may comprise compressor turbine 22, which may drive compressor 16 and other accessories, and power turbine 24 which may rotate independently from compressor turbine 22 and which may drive power shaft 26 which may be drivingly coupled to bladed rotor 12 via reduction gearbox 28. Combustion gases may be evacuated through exhaust duct 30 after passing through turbine section 20.

Bladed rotor 12 may comprise a plurality of pitch-adjustable blades 32 extending radially from hub 34 and being circumferentially distributed relative to hub 34 of bladed rotor 12. Bladed rotor 12 may be a variable pitch bladed rotor where each blade 32 may be angularly adjustable about a respective axis B. Accordingly, each blade 32 may be rotatable about axis B using any suitable mechanism so that the pitch of blades 32 may be adjusted collectively in unison for different phases of operation (e.g., feather, forward thrust and reverse) of engine 10 and/or of an aircraft to which engine 10 and bladed rotor 12 may be mounted. Even though FIG. 1 illustrates bladed rotor 12 as a propeller suitable for fixed-wing aircraft, it is understood that aspects of this disclosure are also applicable to other types of bladed rotors such as main rotors and tail rotors of rotary-wing aircraft such as helicopters for example.

Bladed rotor 12 may be mounted for rotation about rotation axis R. In some embodiments, rotation axis R may, but not necessarily, be coaxial with an axis of rotation of power shaft 26. FIG. 1 also schematically shows an angular (pitch) position feedback system 36 (referred hereinafter as "feedback system 36") associated with bladed rotor 12 and which is described below.

FIG. 2 is a schematic representation of a partial axial cross-section of an exemplary feedback system 36 of engine 10 for providing feedback on the angular position of adjustable blades 32 of bladed rotor 12. Feedback system 36 may be configured to interface with known or other adjustable blade systems to permit the detection of the angular position (e.g., beta angle) of adjustable blades 32. In some embodiments, feedback system 36 may comprise feedback rotor 38, sensor 40 and detection unit 42.

Feedback rotor 38 may be configured to rotate with (e.g., be mechanically coupled to) bladed rotor 12 about rotation axis R. For example, in some embodiments, feedback rotor 38 may be configured to rotate at the same rotational speed and coaxially with bladed rotor 12. However, it is understood that the rotation axis of feedback rotor 38 may not necessarily by coaxial with the rotation axis of bladed rotor 12. Feedback rotor 38 may be axially displaceable along rotation axis R to a plurality of axial positions where an axial position of feedback rotor 38 may correspond to a respective angular (pitch) position of adjustable blades 32. Feedback rotor 38 may comprise circumferentially-spaced apart and detectable features 44 useful for detecting the axial position of the feedback rotor 38 as feedback rotor 38 and bladed rotor 12 rotate. Feedback rotor 38 may consequently be useful for detecting the angular position of adjustable blades 32 by way of a correlation. Feedback rotor 38 may comprise an annular member 46 or wheel with detectable features 44 protruding therefrom. In some embodiments, detectable features 44 and sensor 40 may be disposed on a radially-outer side of annular member 46. Alternatively, detectable features 44 and sensor 40 could be disposed on a radially-inner side of annular member 46 instead.

In various embodiments, detectable features 44 may be of any suitable configurations permitting the passage of such detectable features 44 to be detected by sensor 40. In some embodiments, detectable features 44 may, for example, comprise one or more of the following: protrusions, teeth, walls, voids, recesses and/or other singularities. In various embodiments, detectable features 44 may all be of the same configuration or may comprise features of different configurations. In some embodiments, one or more detectable features 44 may be separate components individually secured to annular member 46 of feedback rotor 38. In some embodiments, one or more detectable features 44 may be integrally formed with annular member 46 so that feedback rotor 38 may have a unitary construction.

Approaches for the integration of feedback rotor 38 with bladed rotor 12 to permit axial movement of feedback rotor 38 to correspond with the angular position of adjustable blades 32 and the use of detectable features 44 to obtain feedback of angular position of adjustable blades 32 are disclosed in US Patent Publication No. 2015/0139798 A1 (title: SYSTEM AND METHOD FOR ELECTRONIC PROPELLER BLADE ANGLE POSITION FEEDBACK), which is incorporated herein by reference.

Sensor 40 may be an inductive (e.g., proximity) sensor suitable for non-contact detection of the passage of detectable features 44 as feedback rotor 38 rotates about rotation axis R. Sensor 40 may be mounted adjacent feedback rotor 38 and secured to some stationary structure of engine 10 via bracket 48 for example or other suitable means. Sensor 40 may be mounted adjacent to rotating feedback rotor 38. In some embodiments, sensor 40 may be configured as a variable reluctance sensor (commonly called a VR sensor) suitable for detecting the proximity of (e.g., ferrous) features. Accordingly, detectable features 44 may be configured to intersect the magnetic field and cause a detectable variation in (e.g., disrupt) the magnetic field that is generated by sensor 40. For example, detectable features 44 may be of any suitable type which would cause the passage of such detectable feature 44 near sensor 40 to provide a change in magnetic permeability within the magnetic field generated by sensor 40 and which could result in a detectable variation in the magnetic field. In various embodiments, detectable features 44 may comprise ferrous or other metallic material(s). Detectable features 44 may be of any type suitable to cause a variation in the magnetic field due to a change in presence of feature(s) 44 in the magnetic field.

Detection unit 42 may be operatively connected to sensor 40 for receiving one or more sensor signals 50 and configured to generate one or more feedback signals 52 indicative of the angular position of adjustable blades 32. In various embodiments, detection unit 42 may form part of a Full Authority Digital Engine Control (FADEC) which may, for example, comprise one or more digital computer(s) or other data processors, sometimes referred to as electronic engine controller(s) (EEC) and related accessories that control at least some aspects of performance of engine 10. Accordingly, detection unit 42 may comprise one or more computing devices including, but not limited to, a digital computer, a processor (e.g. a microprocessor), and a memory. In some embodiments, sensor signal(s) 50 may also be used to provide feedback on the rotational speed of bladed rotor 12. Accordingly, detection unit 42 may, in some embodiments be configured to generate feedback signal(s) 52 indicative of the rotational speed of bladed rotor 12. In some embodiments, feedback system 36 may be referred to as an "Np/beta" feedback system where Np represents the rotational speed of bladed rotor 12 and beta represents the angular position of adjustable blades 32. In some embodiments, detection unit 42 may perform other tasks associated with functions such as synchronization and/or synchrophasing of propellers for example.

Figure 3B:
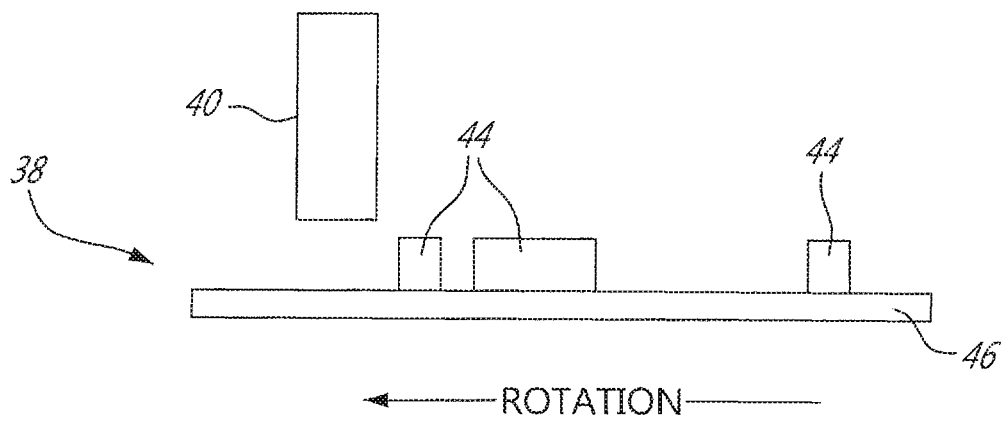

FIG. 3A is a schematic top view of sensor 40 in relation to detectable features 44 about to be detected by sensor 40 as feedback rotor 38 rotates about rotation axis R (see FIG. 2). FIG. 3B is a schematic side view of sensor 40 in relation to detectable features 44 about to be detected by sensor 40 as feedback rotor 38 rotates about rotation axis R. FIGS. 3A and 3B each show a portion of annular member 46 that has been flattened for clarity of illustration. Detectable features 44 may have the form of elongated teeth or walls that protrude radially outwardly from a radially outer surface of annular member 46. The number of detectable features 44 circumferentially distributed around feedback rotor 38 may be used in conjunction with a digital counting function of detection unit 42 for the purpose of determining the rotation speed of bladed rotor 12 for example as the passage of detectable features 44 is detected by sensor 40 and detection unit 42 as feedback rotor 38 rotates relative to sensor 40.

In some embodiments, some of detectable features 44 may be elongated and substantially aligned with (i.e., parallel to) rotation axis R. One or more other elongated detectable features 44 may be oriented to be non-parallel (e.g., oblique) to rotation axis R. The different orientation between adjacent elongated detectable features 44 may provide different detection times between the adjacent detectable features 44 at different axial positions of feedback rotor 38 relative to sensor 40 and such different detection timing may be used to correlate the axial position of feedback rotor 38 to the angular position of adjustable blades 32. Approaches for extracting meaningful information from the passing of detectable features 44 are disclosed in US Patent Publication No. 2015/0139798 A1, which is incorporated herein by reference.

Detectable features 44 may comprise axial edges or terminations 44A where elongated detectable features 44 terminate in the axial direction relative to rotation axis R (see FIG. 2). In some situations, it may be desirable to permit sensor 40 to be positioned near or at edges 44A and still be able to accurately detect the passing of detectable features 44 despite any edge-related effects that may influence sensor 40. This may allow to more fully use of the axial dimension of feedback rotor 38 and promote efficient packaging of feedback rotor 38 by not requiring extra axial length of feedback rotor 38 for the purpose of avoiding such edge-related effects. In some situations, the amount of axial travel of feedback rotor 38 may be dependent on the specific type of bladed rotor 12 and installation constraints. Sensor 40 as described herein may be configured to permit accurate detection of detectable features 44 by mitigating edge-related effects.

Figure 4A:
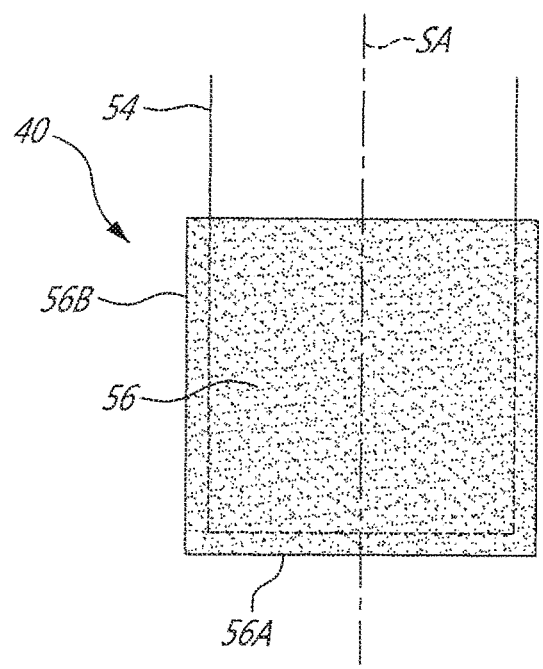
FIGS. 4A and 4B are respective schematic front and bottom views of an exemplary sensor of the feedback system of FIG. 2.
Figure 4B:
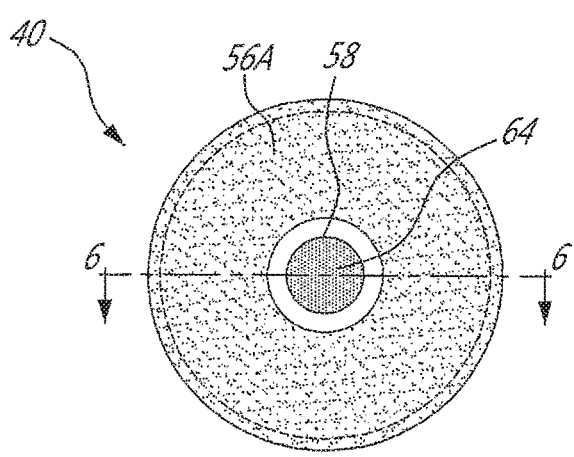

FIGS. 4A and 4B are a partial front view and a bottom view of an exemplary sensor 40 of feedback system 36. Sensor 40 may comprise housing 54 and magnetic shield 56. Housing 54 may have a generally cylindrical shape with a sensor axis SA. In some embodiments, sensor axis SA may be a radial line relative to axis of rotation R shown in FIG. 2. In some embodiments, housing 54 may have a circular outer cross-sectional profile. In some embodiments, magnetic shield 56 may be disposed externally to housing 54. For example, magnetic shield 56 may be mounted by suitable means to the exterior of housing 54. Magnetic shield 56 may be made from one or more materials of relatively high magnetic permeability to readily support the formation of a magnetic field within itself. Accordingly, magnetic shield 56 may provide one or more low-reluctance return paths for magnetic flux as explained below. In some embodiments, magnetic shield 56 may be made from mu-metal or any suitable material(s) exhibiting a relatively high relative magnetic permeability. In some embodiments, the material(s) of magnetic shield 56 may have a relative magnetic permeability value that is between 20,000 and 100,000 for example. In some embodiments, the material(s) of magnetic shield 56 may have a relative magnetic permeability value that is between 80,000 and 100,000 for example. In some embodiments, magnetic shield 56 may comprise bottom wall 56A and one or more side walls 56B cooperatively defining a receptacle (e.g., can) within which part of housing 54 and/or other internal components of sensor 40 may be received. In some embodiments, bottom wall 56A may comprise aperture 58 extending through bottom wall 56A.

Figure 5:
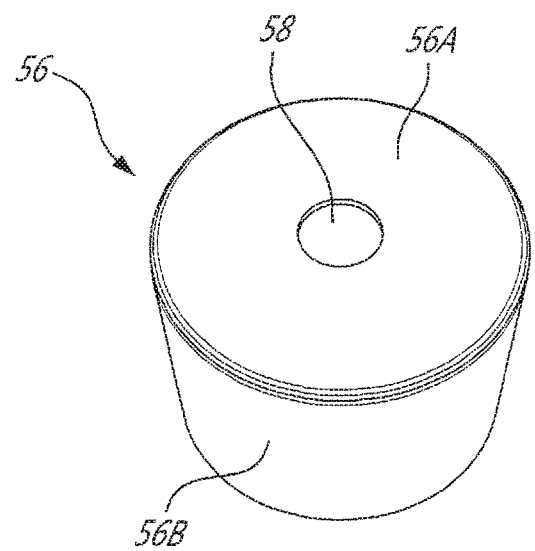
FIG. 5 is a perspective view of a magnetic shield of the sensor of FIGS. 4A and 4B showing an aperture through a bottom wall of the magnetic shield.

FIG. 5 is a perspective view of magnetic shield 56 having a receptacle configuration, showing aperture 58 extending through bottom wall 56A of magnetic shield 56. In some embodiments, magnetic shield 56 may have a single-piece unitary construction wherein bottom wall 56A and side wall(s) 56B are integrally formed. However, it is understood that in some embodiments, bottom wall 56A and side wall(s) 56B may comprise separate components (e.g., washer and sleeve) that are subsequently assembled together to permit magnetic coupling therebetween. The configuration of magnetic shield 56 shown in FIG. 5 may be suitable for fitting over the exterior of housing 54 of sensor 40.

Figure 6A:
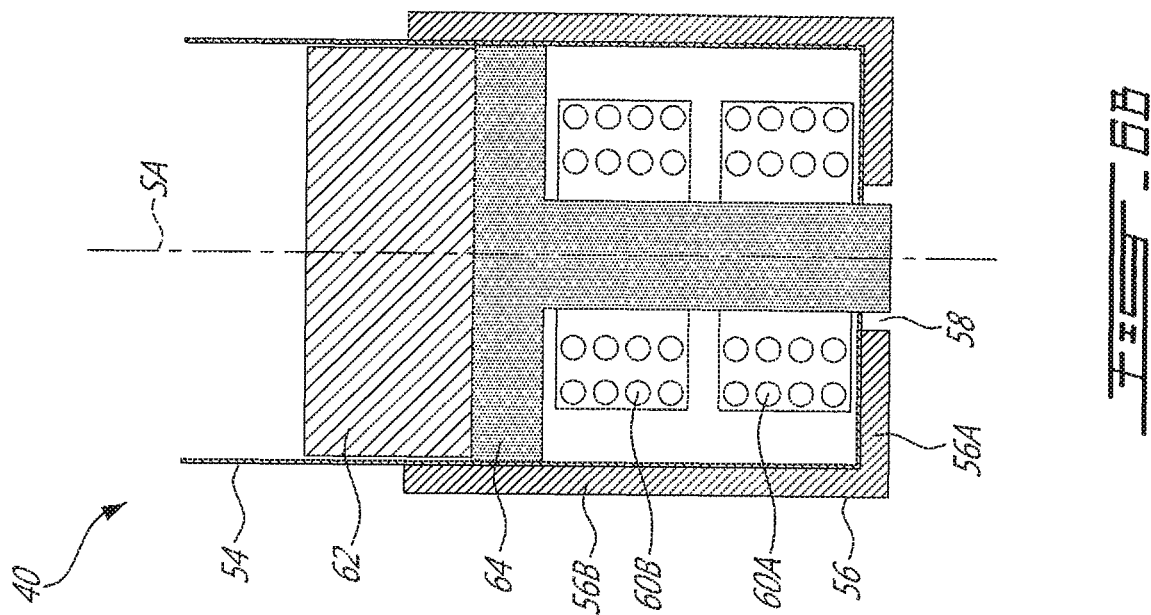
FIGS. 6A and 6B are cross-sectional views of two exemplary embodiments of the sensor of FIGS. 4A and 4B taken along line 6-6 in FIG. 4B.
Figure 6B:
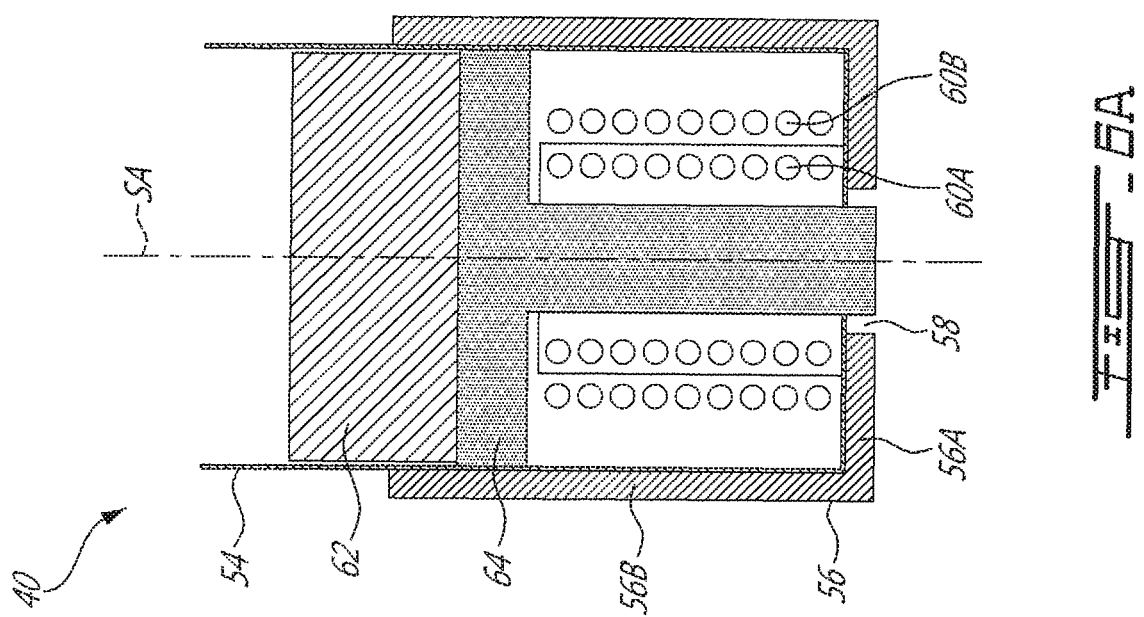

FIGS. 6A and 6B are cross-sectional views of two exemplary embodiments of sensor 40 taken along line 6-6 in FIG. 4B. In some embodiments, sensor 40 may have a single-channel configuration and accordingly may have a single coil 60A disposed inside of housing 54 and configured to generate one or more sensor signals 50 (see FIG. 2) in response to variations in the magnetic field caused by the movement of detectable features 44 by sensor 40. However, in some embodiments, sensor 40 may have a multi-channel configuration wherein sensor signals 50 are acquired in a redundant manner. For example, FIGS. 6A and 6B show different exemplary configurations of coils 60A and 60B for a two-channel configuration of sensor 40 where two coils 60A and 60B that are electrically-isolated from each other may provide redundant sensor signals 50 in response to variations in the magnetic field. For example, coil 60A may be configured to generate one or more first sensor signals 50 (e.g., voltages) on a first channel in response to the variations in the magnetic field, and coil 60B may be configured to generate one or more second sensor signals 50 (e.g., voltages) on a second channel in response to the variations in the magnetic field.

Sensor 40 may also comprise magnet 62 disposed inside housing 54 and generating a magnetic field for intersecting feedback rotor 38. In some embodiments, magnet 62 may be a permanent magnet. Magnet 62 may be stationary and mounted adjacent the rotating feedback rotor 38. In some embodiments, sensor 40 may comprise pole piece 64 configured to direct the magnetic field generated by magnet 62 toward feedback rotor 38 at a location expected to be occupied by one or more features 44. Pole piece 64 may be coupled to one pole of magnet 62 and be configured to direct the magnetic field radially inwardly (or outwardly) generally along sensor axis SA and toward feedback rotor 38 so that the magnetic flux exiting the distal end of pole piece 64 may intersect detectable features 44 as features 44 move past sensor 40. Pole piece 64 may be a structure comprising material of relatively high magnetic permeability that serves to direct the magnetic field generated by magnet 62 toward features 44. Pole piece 64 may be coupled to a pole of magnet 62 and in a sense extend the pole of magnet 62 toward feedback rotor 38. Pole piece 64 may be disposed between magnet 62 and feedback rotor 38.

In reference to FIG. 6A, coils 60A and 60B may be wound around pole piece 64 where coil 60A may be a radially-inner coil and coil 60B may be a radially-outer coil that surrounds coil 60B. In other words coils 60A and 60B may be concentric coils nested one inside the other and may accordingly have different diameters. In some embodiments, coils 60A and 60B may be of substantially the same height along sensor axis SA. Coils 60A, 60B may be stationary relative to magnet 62 and mounted in the magnetic field of magnet 62.

In reference to FIG. 6B, coils 60A and 60B may be wound around pole piece 64 but may be disposed at different elevations (i.e., stacked) along sensor axis SA. In some embodiments, coils 60A and 60B may be substantially identical (e.g., of substantially the same diameter and height along sensor axis SA). Alternatively, coils 60A and 60B may have different configurations from each other. Magnetic shield 56 may be stationary relative to magnet 62 and mounted in the magnetic field of magnet 62.

In some embodiments, magnetic shield 56 may have a receptacle configuration within which coils 60A and 60B are partially or entirely received to that coils 60A and 60B may be shielded by magnetic shield 56. Bottom wall 56A of magnetic shield 56 may be disposed between coils 60A, 60B and feedback rotor 38. In some embodiments, magnetic shield 56 may be symmetric across sensor axis SA to define two or more (e.g., symmetric) return paths for magnetic flux as explained below. In some embodiments, magnetic shield 56 may be axisymmetric about sensor axis 40.

In some embodiments, part of or the entirety of pole piece 64 may be received inside the receptacle defined by the configuration of magnetic shield 56. Aperture 58 in bottom wall 56A of magnetic shield 56 may permit some of the magnetic field that is guided by pole piece 64 to pass through magnetic shield 56 via aperture 58. In some embodiments, aperture 58 may be centrally located within bottom wall 56A. In some embodiments, sensor axis 40 may pass through aperture 58. In some embodiments, a distal portion of pole piece 64 may extend into or through aperture 58. Aperture 58 may be sized and positioned to provide an air gap between magnetic shield 56 and pole piece 64.

FIG. 7 is cross-sectional view of another exemplary sensor 40 of feedback system 36 of FIG. 2. The configuration of sensor 40 shown in FIG. 7 may have functional similarities with the configuration of sensor 40 shown in FIG. 6A. FIG. 7 however shows a configuration where magnetic shield 56 is disposed inside of housing 54 of sensor 40. For example, magnetic shield 56 may be mounted by suitable means to the interior of housing 54. In various embodiments, part(s) of permeable magnetic shield 56 may be disposed inside or outside of housing 54 to provide one or more desired magnetic return paths.

FIGS. 8A and 8B are respective schematic front and bottom views of another exemplary embodiment of sensor 40 of feedback system 36. FIG. 8C is a cross-sectional view of sensor 40 of FIGS. 8A and 8B taken along line 8-8 in FIG. 8B. It is understood that magnetic shield 56 may have different configurations to achieve different types and amounts of magnetic flux guiding in different applications. The specific geometry of magnetic shield 56 may vary based on the specific configurations of sensor 40 and of feedback rotor 38 for example. In this embodiment, magnetic shield 56 may comprise only bottom wall 56A, which may be adequate in some applications. In this embodiments, magnetic shield 56 may have a "washer" configuration with aperture 58 formed therethrough. Magnetic shield 56, 56A may be disposed outside or inside of housing 54.

FIGS. 9A and 9B are respective schematic front and bottom views of another exemplary embodiment of sensor 40 of feedback system 36. FIG. 9C is a cross-sectional view of sensor 40 of FIGS. 9A and 9B taken along line 9-9 in FIG. 9B. In this embodiment, magnetic shield 56 may comprise only side wall(s) 56B, which may be adequate in some applications. In this embodiments, magnetic shield 56 may have an open-ended "sleeve" configuration. Magnetic shield 56, 56B may be disposed outside or inside of housing 54.

Figure 10A:
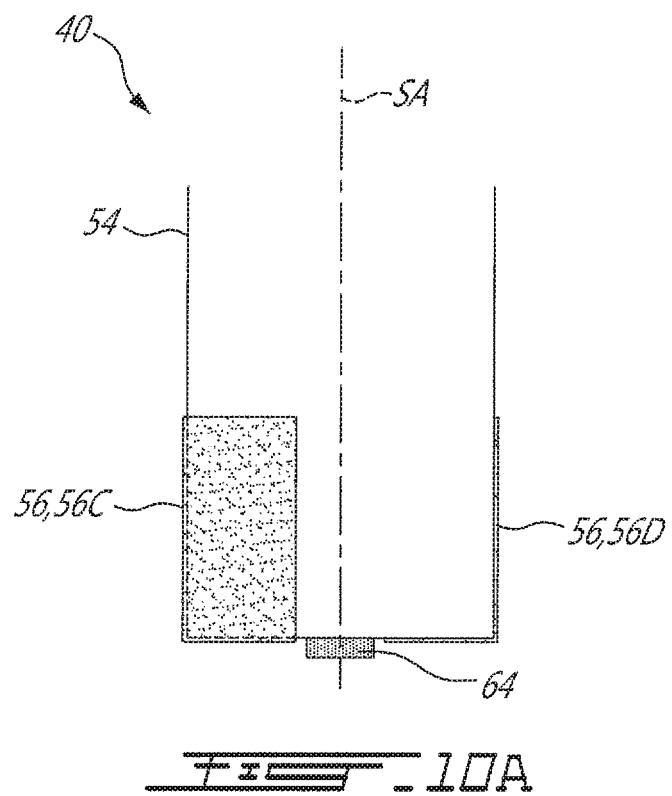
FIGS. 10A and 10B are respective schematic front and bottom views of another exemplary sensor of the feedback system of FIG. 2.
Figure 10B:
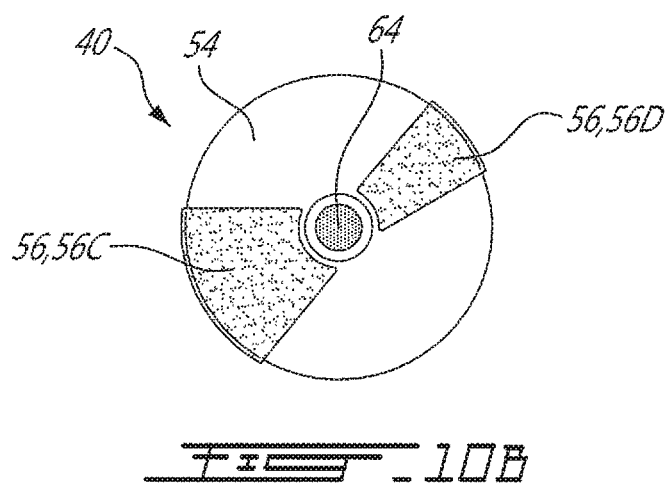

FIGS. 10A and 10B are respective schematic front and bottom views of another exemplary embodiment of sensor 40 of feedback system 36. In various embodiments, magnetic shield 56 may not necessarily have an axisymmetric configuration. For example, magnetic shield 56 or portions 56C, 56D thereof may be disposed at locations where providing one or more magnetic return paths is more desirable based on the specific configuration of feedback system 36. In this particular configuration, the passage of feature 44 by sensor 40 may produce a disturbance or variation having some directionality in the magnetic field generated by magnet 62. Accordingly, in some embodiments, it may be adequate to provide magnetic return paths at the locations of portions 56C and 56D as illustrated. In various embodiments, portions 56C and 56D may define only part of the receptacle defined by magnetic shield 56 illustrated in FIG. 5. In various embodiments, each portion 56C, 56D may comprise a bottom wall portion and/or a side wall portion. Portions 56C, 56D may be disposed outside or inside of housing 54. In some embodiments, portions 56C, 56D may define separate magnetic return paths at different desired locations.

FIGS. 11A and 11B are cross-sectional views of sensor 40 of FIG. 6A without magnetic shield 56 and with magnetic shield 56 respectively to show the effect of magnetic shield 56 on leakage magnetic flux 66 within the magnetic field generated by magnet 62. In some embodiments of sensor 40, the magnetic field generated by magnet 62 may not entirely and completely be directed to feedback rotor 38 via the distal end of pole piece 64. For example, there may be some leakage magnetic flux represented by magnetic flux lines 66 which leaks from pole piece 64 or from magnet 62. Such leakage magnetic flux 66 may be partly due to the change in diameter of pole piece 64 as it extends along sensor axis SA. It is understood that in the configuration of sensor 40 shown, leakage magnetic flux 66 could be present substantially around sensor axis SA in a substantially axisymmetric manner even though FIGS. 11A and 11B show fewer flux lines for clarity.

FIG. 11B shows the effect of magnetic shield 56 on such leakage magnetic flux 66. Bottom wall 56A and side wall(s) 56B of magnetic shield 56 may provide one or more low-reluctance magnetic return paths for efficiently guiding leakage magnetic flux 66 toward the opposite pole of magnet 62. Accordingly, magnetic shield 56 may provide controlled and predictable magnetic return path(s) for such leakage magnetic flux 66 so that the effects of such leakage magnetic flux 66 on coils 60A and 60B may be reduced. In other words, magnetic shield 56 may shunt most of leakage magnetic flux 66 back toward the opposite magnetic pole of magnet 62 thereby isolating such leakage magnetic flux 66 from external influences (e.g., detectable features 44). In other words, magnetic shield 56 may more efficiently close the magnetic circuit between the two opposite (i.e., North and South) poles of magnet 62 for leakage magnetic flux 66. Depending on its configuration, magnetic shield 56 may provide two or more highly-permeable magnetic return paths that may be symmetric across sensor axis SA or a plurality of highly-permeable magnetic return paths that may be angularly distributed about sensor axis SA in an axisymmetric manner.

FIGS. 12A and 12B are cross-sectional views of sensor 40 of FIG. 6A without magnetic shield 56 and with magnetic shield 56 respectively to show the effect of magnetic shield 56 on the magnetic field generated by magnet 62 near edge 44A of detectable feature 44. When sensor 40 is positioned away from edge 44A so that the magnetic field is not influenced by edge 44A, the return path for the magnetic flux has substantially symmetrical permeability across sensor axis 44 provided by sufficient amounts of material (e.g., metal) from detectable feature 44 being located on each side of sensor 40 so an unshielded sensor as shown in FIG. 12A may be suitable. However, as edge 44A of detectable feature 44 approaches sensor 40, the different amounts of material from detectable feature 44 on either sides of sensor 40 can result in asymmetric permeability and skew the magnetic field of the unshielded sensor. The skewing of the magnetic field exhibited with the unshielded sensor is schematically illustrated in FIG. 12A by line M being offset from sensor axis SA and by the asymmetry of magnetic flux 66 and 68. Such edge-related effect exhibited in the magnetic field as edge 44A is approached by sensor 40 may cause some error with sensor signals 50 produced by coils 60A and 60B. Such errors can include some error(s) in the determined axial position of feedback rotor 38 and/or some discrepancies between supposedly redundant sensor signals 50 obtained from separate coils 60A and 60B of different channels. In some situations, this error can increase exponentially as edge 44A approaches the unshielded sensor and can therefore limit the amount of useable axial movement available for a given length of detectable features 44. For example, additional length of detectable features 44 may be required beyond each end of the axial travel of feedback rotor 38 relative to the unshielded sensor in order to avoid potential errors from such edge effects.

Leakage magnetic flux 66 passing across coils 60A and 60B in the unshielded sensor of FIG. 12A may be influenced by an external magnetic event such as the change in presence or movement (e.g., passage) of detectable feature 44 in the magnetic field. Since the two coils 60A and 60B can be of different sizes and/or positions, each coil 60A and 60B may see a different amount of varying magnetic flux due to the asymmetry in the magnetic field and this may cause a discrepancy (e.g., channel A-B split) between sensor signals 50 obtained from separate coils 60A and 60B of different channels.

The addition of magnetic shield 56 to sensor 40 as shown in FIG. 12B provides highly-permeable magnetic return path(s) that may be symmetric across sensor axis SA and which can reduce the edge-related effect otherwise exhibited using the unshielded sensor and consequently reduce the likelihood of errors. As shown in FIG. 12B, the use of magnetic shield 56 may, in some embodiments, result in a more symmetric magnetic field even near edge 44A of detectable feature 44. This may result in an increase in available amount of useable axial displacement of feedback rotor 38 for a given axial length of detectable feature 44. Consequently, this may result in more efficient packaging of feedback system 36.

In some embodiments, the use of magnetic shield 56 may, by shunting some leakage magnetic flux 66 which does not intersect with detectable features 44, cause coils 60A, 60B to mostly only see varying magnetic flux 68 that has been directed by pole piece 64 to feedback rotor 38 and that has been influenced by the passing of detectable feature 44. Accordingly, this may reduce the likelihood of discrepancy (e.g., channel A-B split) between sensor signals 50 obtained from separate redundant coils 60A and 60B of different channels. Magnetic shield 56 may guide some leakage magnetic flux 66 that does not intersect detectable features 44 along one or more magnetic return paths of relatively low reluctance. Accordingly, the use of magnetic shield 56 may promote a more symmetric magnetic field as shown by line M being aligned with sensor axis SA in FIG. 12B.

FIG. 13 is a flowchart of a method 1000 for providing angular (pitch) position feedback for pitch-adjustable blades 32 of aircraft bladed rotor 12. In some embodiments, method 1000 may be carried out using sensor 40 as disclosed herein but the execution of method 40 is not limited to the specific systems 36 and sensors 40 disclosed herein. In some embodiments, method 1000 may comprise:

directing a magnetic field from a first pole of magnet 62 toward a location that moving features 44 indicative of a pitch (e.g., angular position, beta angle) of the pitch-adjustable blades 32 are expected to occupy as moving features 44 move relative to magnet 62 (see block 1002), the magnetic field including first magnetic flux 68 intersecting the location that moving features 44 are expected to occupy and second magnetic flux 66 not intersecting the location that moving features 44 are expected to occupy;

guiding second magnetic flux 66 toward an opposite second pole of magnet 62 along one or more magnetic return paths (see block 1004);

detecting a variation in the magnetic field caused by movement (e.g., passing) of one or more of the moving features 44 in the magnetic field (see block 1006); and generating signal 52 indicative of the pitch of the pitch-adjustable blades based on the detection of the variation in the magnetic field (see block 1008).

Method 1000 may comprise using pole piece 64 to direct the magnetic field from a first pole of magnet 62 generating the magnetic field toward a location that features 44 are expected to occupy. Second magnetic flux 66 may comprise magnetic flux leaking from pole piece 64. The one or more magnetic return paths may guide second magnetic flux 66 toward an opposite second pole of magnet 62.

The one or more magnetic return paths may comprise two or more (e.g., symmetric) magnetic return paths.

Method 1000 may comprise detecting the one or more variations in the magnetic field in a redundant manner (e.g., using separate and electrically isolated coils 60A and 60B).

Method 1000 may comprise directing the first magnetic flux through aperture 58 in wall 56A of magnetic shield 56 that is disposed between magnet 62 and moving features 44.

Method 1000 may comprise directing the first magnetic flux through aperture 58 in wall 56A of magnetic shield 56 defining the one or more magnetic return paths.

The above description is meant to be exemplary only, and one skilled in the relevant arts will recognize that changes may be made to the embodiments described without departing from the scope of the invention disclosed. The present disclosure may be embodied in other specific forms without departing from the subject matter of the claims. The present disclosure is intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. An engine having a feedback system for pitch-adjustable blades of an aircraft bladed rotor, the system comprising:

a feedback rotor configured to rotate with the aircraft bladed rotor about a rotation axis, the feedback rotor being axially displaceable along the rotation axis to a plurality of axial positions, the axial position of the feedback rotor corresponding to a respective pitch position of the pitch-adjustable blades, the feedback rotor comprising elongated features spaced circumferentially around the feedback rotor, each elongated feature having an axial edge where the elongated feature terminates along the rotation axis;

a sensor including:
a sensor housing;
a stationary magnet mounted in the engine adjacent the rotating feedback rotor, the magnet having a magnetic field;
a pole piece coupled to a first pole of the magnet and configured to direct the magnetic field toward the elongated features along a sensor axis, part of the pole piece being disposed in the sensor housing;
a coil mounted in the magnetic field and being stationary relative to the magnet, the coil being configured to generate a sensor signal indicative of a variation in the magnetic field caused by movement of one or more of the elongated features in the magnetic field as the feedback rotor rotates relative to the magnet; and a magnetic shield disposed inside or outside of the sensor housing, the magnetic shield mounted in the magnetic field and being stationary relative to the magnet, the magnetic shield defining a magnetic return path for some magnetic flux of the magnetic field exiting the pole piece toward an opposite second pole of the magnet, the magnetic shield having a side wall and a bottom wall cooperatively defining part of a receptacle receiving the part of the pole piece, the bottom wall defining an aperture for permitting passage of the magnetic field through the magnetic shield via the aperture; and a detection unit operatively connected to the coil and configured to generate a feedback signal indicative of the respective pitch position of the pitch-adjustable blades in response to the sensor signal received from the coil;

wherein:

the feedback rotor is axially displaceable between a first position and a second position relative to the sensor;

the first position corresponds to the sensor being axially distal of a first axial edge of a first of the elongated features; and the second position corresponds to the sensor axially overlapping the first axial edge of the first elongated feature where the first elongated feature provides an asymmetric magnetic permeability for the magnetic field about the sensor axis.

2. The engine as defined in claim 1, wherein the pole piece is disposed between the magnet and the feedback rotor.

3. The engine as defined in claim 1, wherein the pole piece extends into the aperture in the magnetic shield.

4. The engine as defined in claim 1, wherein at least part of the magnetic shield is disposed inside the sensor housing, the sensor housing containing the magnet and the coil.

5. The engine as defined in claim 1, wherein at least part of the magnetic shield is disposed outside the sensor housing, the sensor housing containing the magnet and the coil.

6. The engine as defined in claim 3, wherein the pole piece is disposed between the magnet and the feedback rotor.

7. The engine as defined in claim 1, wherein the receptacle receives part of the coil.

8. The engine as defined in claim 1, wherein:

the coil is a first coil and the sensor signal is a first sensor signal indicative of the variation in the magnetic field on a first channel;

the system comprises a second coil configured to generate a second sensor signal indicative of the variation in the magnetic field on a second channel;

the first and second coils are disposed at different axial locations along the sensor axis.

9. The engine as defined in claim 1, wherein the bottom wall of the magnetic shield is disposed between the coil and the feedback rotor.

10. The engine as defined in claim 1, wherein the magnetic shield has a relative permeability value that is between 20,000 and 100,000.

11. A method for providing pitch position feedback for pitch-adjustable blades of an aircraft bladed rotor, the method comprising:

rotating a feedback rotor with the aircraft bladed rotor about a rotation axis;

axially displacing the feedback rotor along the rotation axis based on a pitch of the pitch-adjustable blades between a first position and a second position relative to a sensor having a sensor axis, the first position corresponding to the sensor being axially distal of a first axial edge of a first of a plurality of moving elongated features of the feedback rotor, the second position corresponding to the sensor axially overlapping the first axial edge of the first elongated feature where the first elongated feature provides an asymmetric magnetic permeability for a magnetic field generated by the sensor along the sensor axis;

directing the magnetic field from a first pole of a magnet of the sensor toward a location that the moving elongated features, which are indicative of the pitch of the pitch-adjustable blades, are expected to occupy as the moving elongated features move relative to the magnet, the magnetic field including first magnetic flux intersecting the location that the moving elongated features are expected to occupy and second magnetic flux not intersecting the location that the moving elongated features are expected to occupy;

guiding the second magnetic flux toward an opposite second pole of the magnet along one or more magnetic return paths defined by a magnetic shield having a side wall and a bottom wall cooperatively defining part of a receptacle receiving part of a pole piece disposed in a sensor housing and coupled to the first pole of the magnet, the bottom wall defining an aperture for permitting passage of the magnetic field through the magnetic shield via the aperture, the magnetic shield disposed inside or outside of the sensor housing;

detecting a variation in the magnetic field caused by movement of one or more of the moving elongated features in the magnetic field; and generating a signal indicative of the pitch of the pitch-adjustable blades based on the detection of the variation in the magnetic field.

* * * * *